US011231329B2

(12) United States Patent
Kyaw

(10) Patent No.: US 11,231,329 B2
(45) Date of Patent: Jan. 25, 2022

(54) SMART WIRELESS THERMO-SENSING DEVICE

(71) Applicant: Zin Thein Kyaw, San Jose, CA (US)

(72) Inventor: Zin Thein Kyaw, San Jose, CA (US)

(73) Assignee: Zin Thein Kyaw

(*) Notice: Subject to any disclaimer, the term of this patent is extended or adjusted under 35 U.S.C. 154(b) by 0 days.

(21) Appl. No.: 15/895,362

(22) Filed: Feb. 13, 2018

(65) Prior Publication Data
US 2019/0323898 A1 Oct. 24, 2019

Related U.S. Application Data

(60) Provisional application No. 62/459,212, filed on Feb. 15, 2017.

(51) Int. Cl.
  *G01K 1/024* (2021.01)
  *H04W 4/38* (2018.01)
  *G01K 15/00* (2006.01)

(52) U.S. Cl.
  CPC ........... *G01K 1/024* (2013.01); *G01K 15/005* (2013.01); *H04W 4/38* (2018.02)

(58) Field of Classification Search
  CPC .... G01K 1/024; G01K 1/026; G01K 2207/00; G01K 2207/02; G01K 2207/08; G01K 2207/06; H04W 4/38
  See application file for complete search history.

(56) References Cited

U.S. PATENT DOCUMENTS

| | | | | |
|---|---|---|---|---|
| 8,781,079 | B2* | 7/2014 | Hao | H04M 3/53333 379/88.13 |
| 8,931,400 | B1 | 1/2015 | Allen | |
| 9,512,715 | B2* | 12/2016 | Challener | G01K 1/024 |
| 9,799,199 | B2 | 10/2017 | Allen | |
| 10,058,206 | B2* | 8/2018 | Cote | A47J 27/62 |
| 10,218,833 | B2* | 2/2019 | Colston | H04L 67/125 |
| 2011/0178863 | A1* | 7/2011 | Daigle | G06Q 30/0231 705/14.31 |
| 2014/0052319 | A1* | 2/2014 | Taylor | G07C 5/008 701/22 |
| 2015/0302762 | A1* | 10/2015 | Sabourian-Tarwe | G09B 7/00 434/127 |
| 2015/0339394 | A1* | 11/2015 | Jinq | G09B 19/00 715/776 |

OTHER PUBLICATIONS

Maverick Thermometers, Maverick ET-735 Bluetooth BBQ Thermometer, Sep. 14, 2015, YouTube, internet, available at https://www.youtube.com/watch?v=wu0FNz2Wblo (Year: 2015).*
Nicasio, 5 Key Ingredients of a Winning Loyalty Program, Jan. 13, 2015, internet, available at https://www.vendhq.com/blog/5-key-ingredients-winning-loyalty-program/ (Year: 2015).*

* cited by examiner

*Primary Examiner* — Michael McCullough

(57) ABSTRACT

A smart Wi-Fi thermo-sensing device, which allows remote monitoring of temperature with an application running on a smartphone, tablet, or personal computer. The device allows a user to monitor a temperature such as in cooking food from where ever a smart phone has connectivity. In addition the smart device will allow for upload and download of data to and from a backend server allowing users to access prior thermo-sensing data. The invention also allows users to participate in contests which may include prizes and or coupons based on different activity conducted with the smart device.

1 Claim, 12 Drawing Sheets

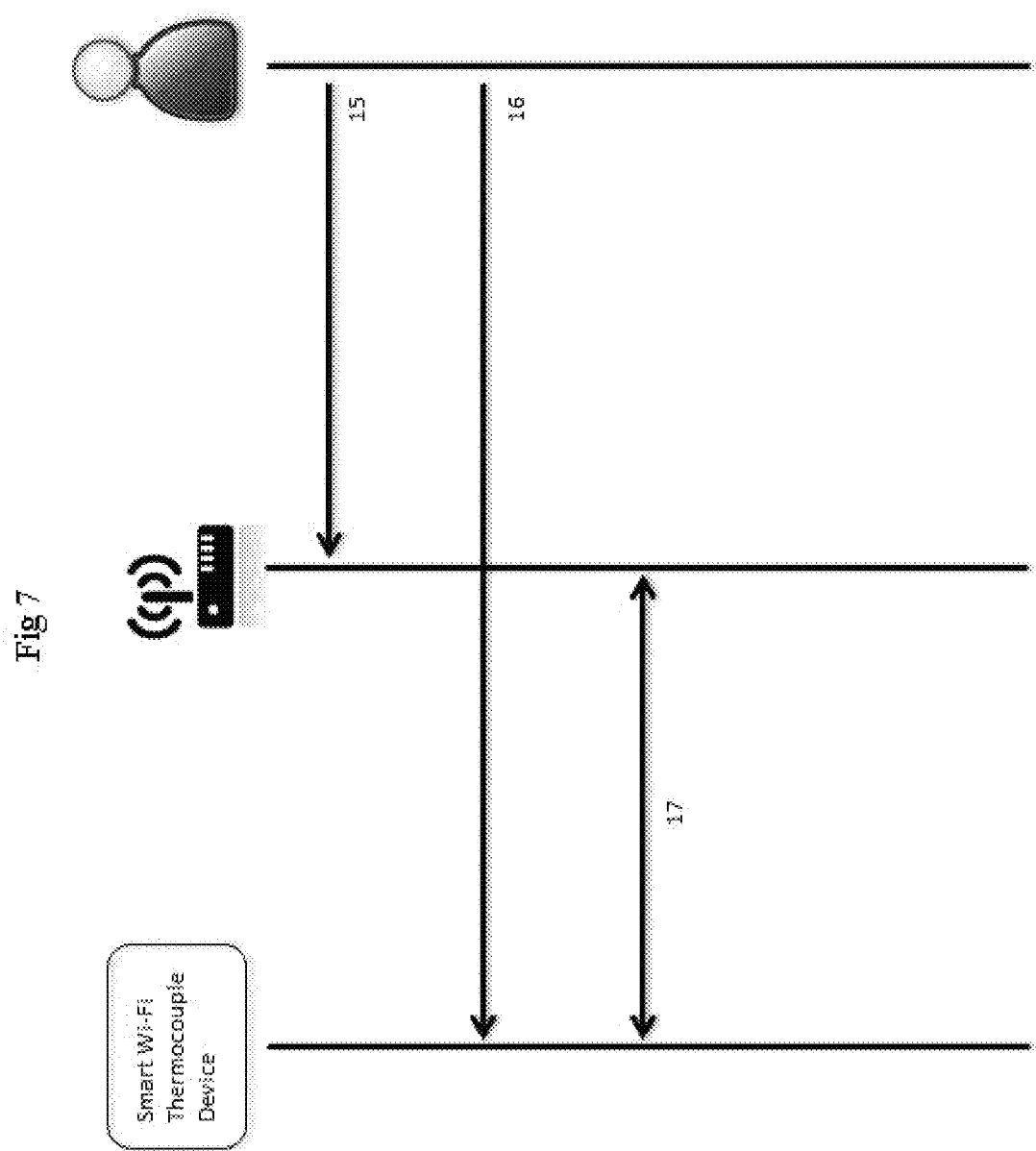

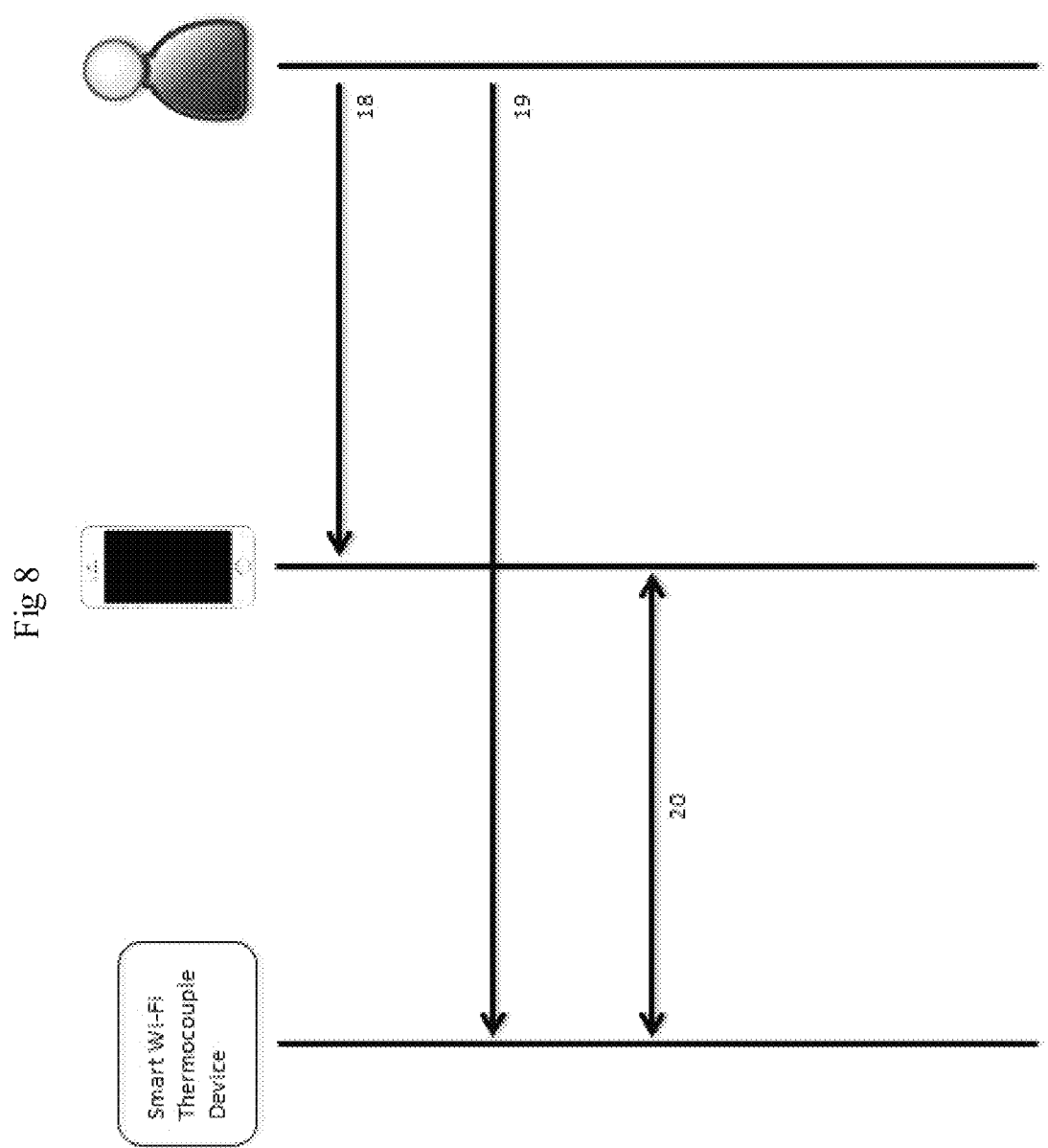

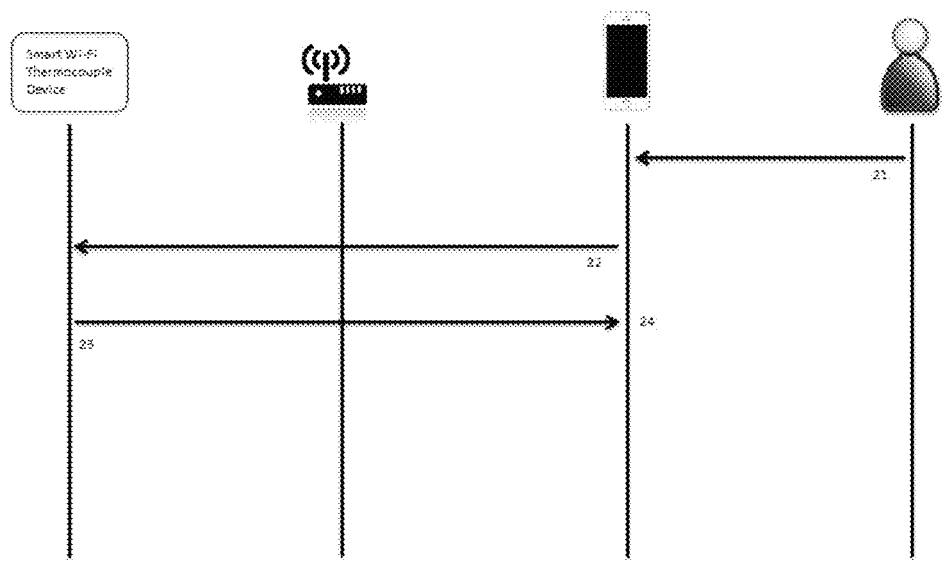
FIG. 9. Sequence Diagram showing the discovery model in Wireless Access Point Mode
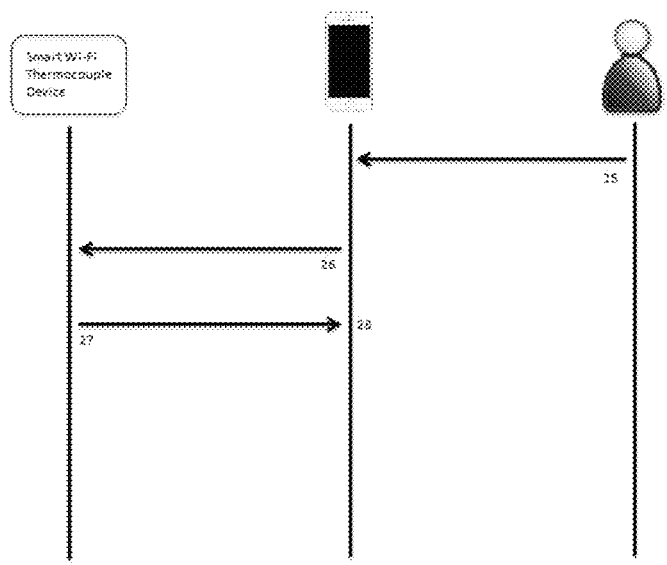
FIG. 10. Sequence Diagram showing the discovery model in Wireless Access Point Mode

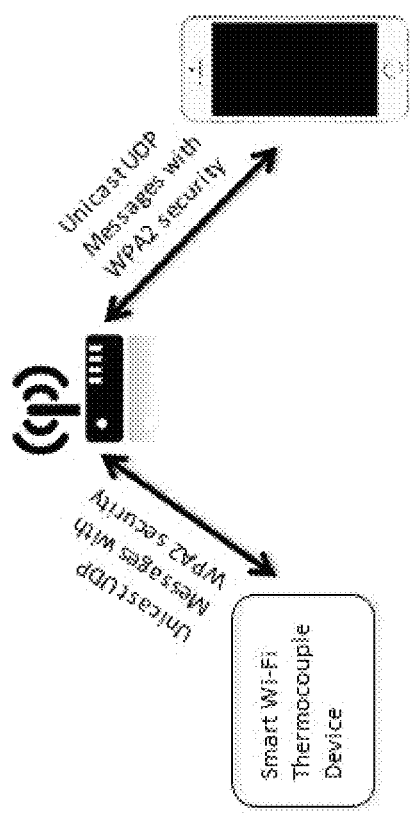
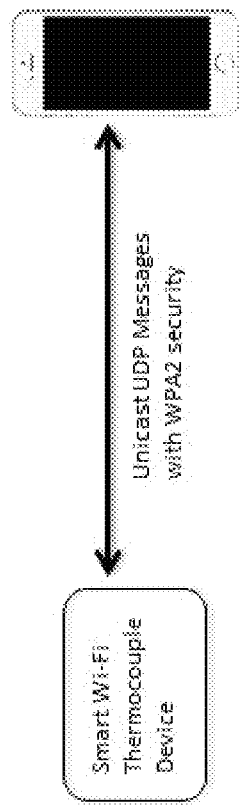
Fig. 11

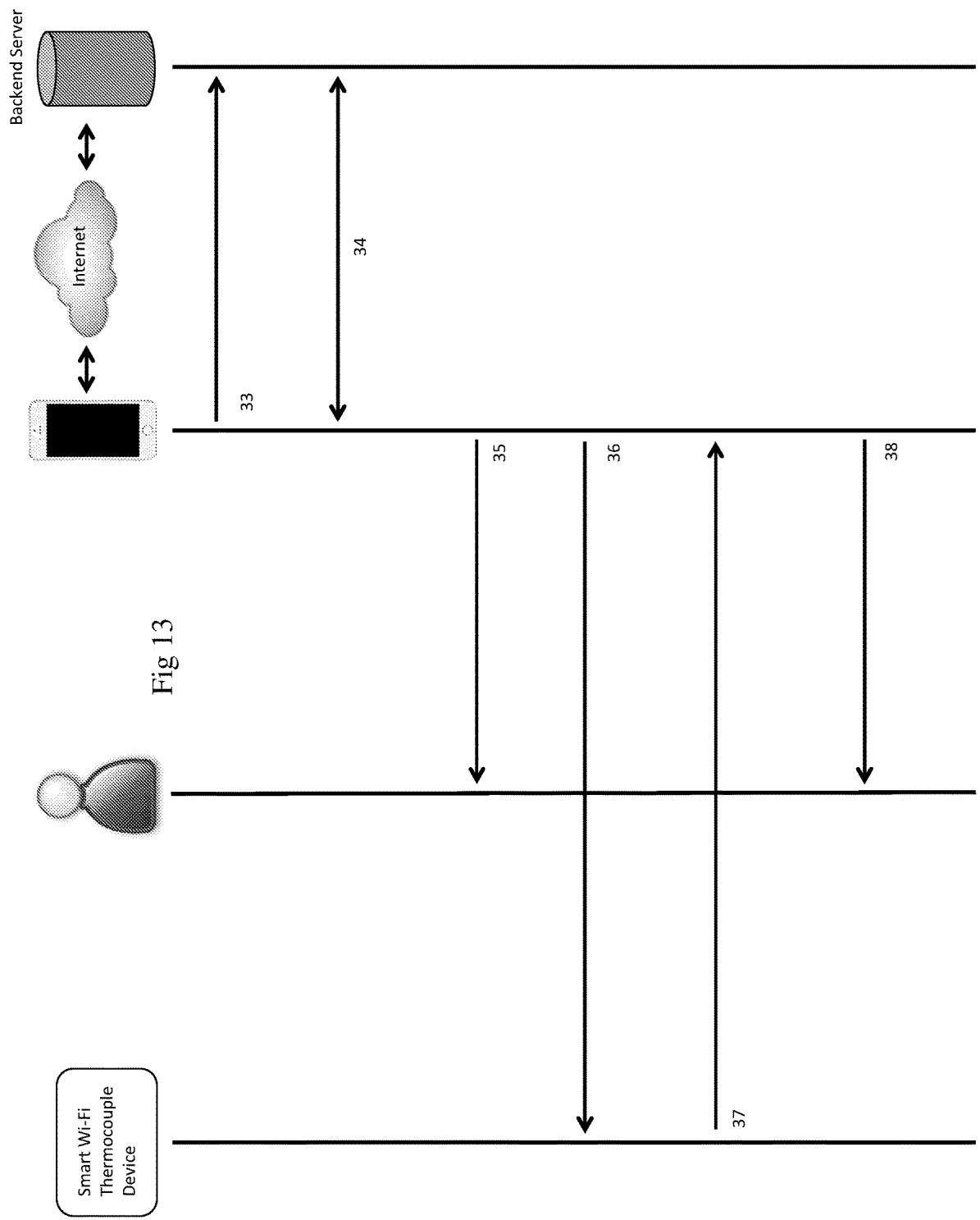

SMART WIRELESS THERMO-SENSING DEVICE

RELATED APPLICATIONS

Provisional Filed Feb. 15, 2017 Application 62/459,212

FEDERALLY SPONSORED RESEARCH

N/A

SEQUENCE LISTING OR PROGRAM

N/A

SUMMARY OF THE INVENTION

The present invention relates generally to the smart Wireless thermo-sensing device. For the purposes of this description, the invention relates to a thermo-sensing probe which could be a thermocouple probe, thermo-resistance probe, an infrared sensor, or any multitude of temperature measuring apparatus. The present invention can be remotely accessed from a smartphone or tablet running a native mobile application or integrated web browser, or a personal computer using a web browser. The present invention is only used to remotely monitor temperature readings and alert the user when the desired temperature setting(s) has been reached and does not directly control any equipment heating or cooling devices. The smart wireless thermo-sensing device is tied to an application running on the web-enabled computing device (smartphone, tablet, or personal computer) which can collect temperature data to be used again by the user or other users of the application and uses an achievement and rewards system implemented as part of the application. This achievement and rewards system is designed to promote user engagement and frequent use of the smart Wireless thermo-sensing device.

BACKGROUND OF INVENTION

There are many consumer and industrial processes that require continuous monitoring of temperature, where immediate notification to the observer is required once the target temperature(s) is reached. The present invention allows the user to be notified remotely via wireless on their smartphone, tablet, or personal computer that the desired temperature(s) has been reached without the user having to manually monitor the process.

Wirelessly monitoring temperature has been achieved in the past by employing proprietary (e.g. 433 MHz, 900 MHz) or BLUETOOTH Low Energy radio transceivers, and devices that employ these radios have also used thermistor or other non-thermocouple-based temperature sensors. Non-thermocouple-based temperature sensors/probes are known to be susceptible to damage over prolonged exposure to high temperatures and provide slow temperature readings. For many consumer and industrial processes these specifications are limitations. BLUETOOTH Low Energy and proprietary radio transceivers also have the disadvantage that the device is only functional while in the radio range of the smartphone, tablet, or personal computer.

Another goal of the present invention is to simplify the circuitry used when making a wireless temperature reading. In U.S. Pat. No. 8,730,038 to Durian FIG. 3 and FIG. 10 show the prior art using a two microchip solution. The present invention eliminates the repetitive two chips and uses only one microchip that allows for straight to wireless communication.

The present invention uniquely accomplishes straight to wireless communication with the combination of a Wireless System-on-Chip (SoC) and a thermo-sensing amplifier integrated circuit (IC) housed in one device. The invention uses a Wireless System-on-Chip that already includes a microcontroller and wireless radio in one chip, therefore removing the need for an external microcontroller in the device. This represents a significant cost savings as other devices use a separate microcontroller and wireless modules.

By employing Wireless technology, the present invention can be accessed anywhere a Wireless access point is available on the premises and is therefore not tied down to being within radio range of the smartphone, tablet, or personal computer. The use of Wireless also means that a separate gateway or hub is not required on the premises, such as a ZIGBEE, Z-WAVE, THREAD, 6LOWPAN, or BLUETOOTH Low Energy gateway. In addition, the use of a thermo-sensing amplifier IC allows various thermo-sensing temperature sensors/probes to be utilized, providing advantages such as accurate and fast readings, and the ability to conduct measurements while there is long term exposure to high and low temperatures (up to +1768 degrees Centigrade and as low as −270 degrees Centigrade). Many consumer and industrial processes require these attributes. The present invention also allows different thermo-sensing probes to be attached by employing a plurality of thermo-sensing receptacles that use standard thermo-sensing connectors, which are widely used and available in the industry (e.g. http://www.omega.com/pptst/MPJ.html). The present invention does not use any proprietary connectors. Therefore, the invention can be used in a variety of consumer and industrial processes that require specific probe types. The probe itself can be procured separately and switched out based on the application requirements. Multiple thermo-sensing probes require different calibration data which can be entered through the user interface depending on the thermo-sensing selected.

There is also a need to promote repetitive and frequent use of the smart Wireless thermo-sensing device so a significant database can be established allowing users to access prior users' heating and cooling information. In this invention, it is anticipated that a rewards program will encourage further user adoption of the smart wireless thermo-sensing device. Adoption and longevity of usage is a challenge when building a database and a rewards program, which could be designed through any means, social media, coupon rewards, or competition. The achievement and rewards system has been designed into the application running on the web-enabled computing device (smartphone, tablet, or personal computer). This allows the user to accumulate points, unlock achievement badges, and redeem rewards for their level of engagement with the device all the while submitting thermo-sensing data to the database. The user could also share their achievements via social media methods, thus encouraging community interaction and involvement, making it not only a personal but a social experience with the smart wireless thermo-sensing device.

DETAILED DESCRIPTION

All drawings and description are for the purpose of describing a single embodiment of the present invention and are not intended to limit the scope of the invention.

The present invention is a smart wireless thermo-sensing device that allows a user to remotely monitor a temperature measurement with a web-enabled computing device. Electronic devices such as smartphones, laptops, handheld tablets, or desktop computers can be recognized as web-enabled computing devices. The wireless technology described in the invention could be any wireless protocol such as but not limited to WI-FI protocol, BLUETOOTH, radio signal, WI-FI Direct, or even infrared signal.

Figure 1:
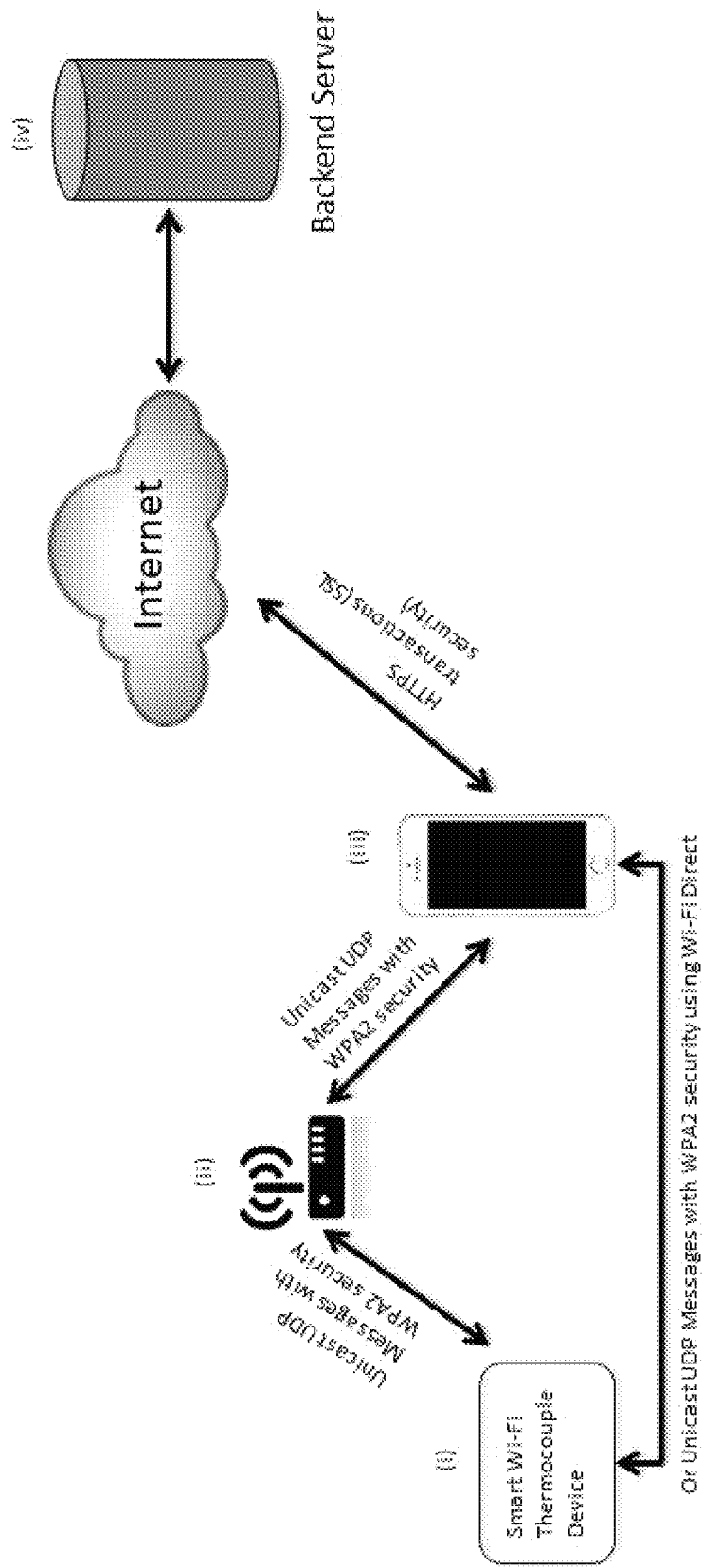
FIG. 1. View of the system for the present invention
FIG. 2. Block diagram of the present invention
FIG. 3. Schematic view of the present invention showing the Wireless SoC, Thermo-sensing Amplifier IC, Status LEDs, Push Button, screw terminal for connecting the Mini Thermo-sensing Female Receptacle, and supporting circuitry FIG. 4. Schematic view of the present invention showing the Battery Charger IC, Micro USB Connector, and supporting circuitry FIG. 5. Schematic view of the present invention showing the 3.3V Voltage Regulator IC, JST connector (JP3) for the Rechargeable Li-Po Battery, headers (J2 and J3) for connecting the Power On/Off Switch, and supporting circuitry FIG. 6. Flow chart illustrating the overall process that is followed by the present invention FIG. 7. Sequence diagram showing the commissioning model in Wireless Access Point Mode FIG. 8. Sequence Diagram showing the commissioning model in Wireless Direct Mode FIG. 9. Sequence Diagram showing the discovery model in Wireless Access Point Mode FIG. 10. Sequence Diagram showing the discovery model in Wireless Direct Mode FIG. 11. Diagram showing the data transfer modes FIG. 12. Sequence diagram showing the archival process of application data with a backend server FIG. 13. Sequence diagram showing Firmware Over-the-Air upgrade process.

In reference to FIG. 1, the smart Wireless thermo-sensing device (i) connects to the smartphone (iii), tablet, or personal computer through an existing wireless access point (ii), or directly to the web-enabled computing device using Wireless Direct. The advantage of this over previous methods is two-fold: 1) it allows the user to be mobile anywhere the Wireless access is present, and 2) if direct communication to the present invention is required, then by using Wireless Direct, the user can also be connected to the internet at the same time. Messages exchanged between the applications running on web-enabled computing device use unicast UDP transactions, other than device discovery messages sent from the web-enabled computing device, which use broadcast UDP transactions. Any data stored on the web-enabled computing device can be archived to or restored from a backend server (iv) through the internet using HTTP transactions secured with Secure Sockets Layer (SSL). The backend server is also used to collect thermo-sensing data, and user input data for the cumulative database and to push Firmware Over-The-Air updates to the web-enabled computing device, at which point the user has the option to update the firmware or configuration settings on the smart wireless thermo-sensing device.

Figure 2:
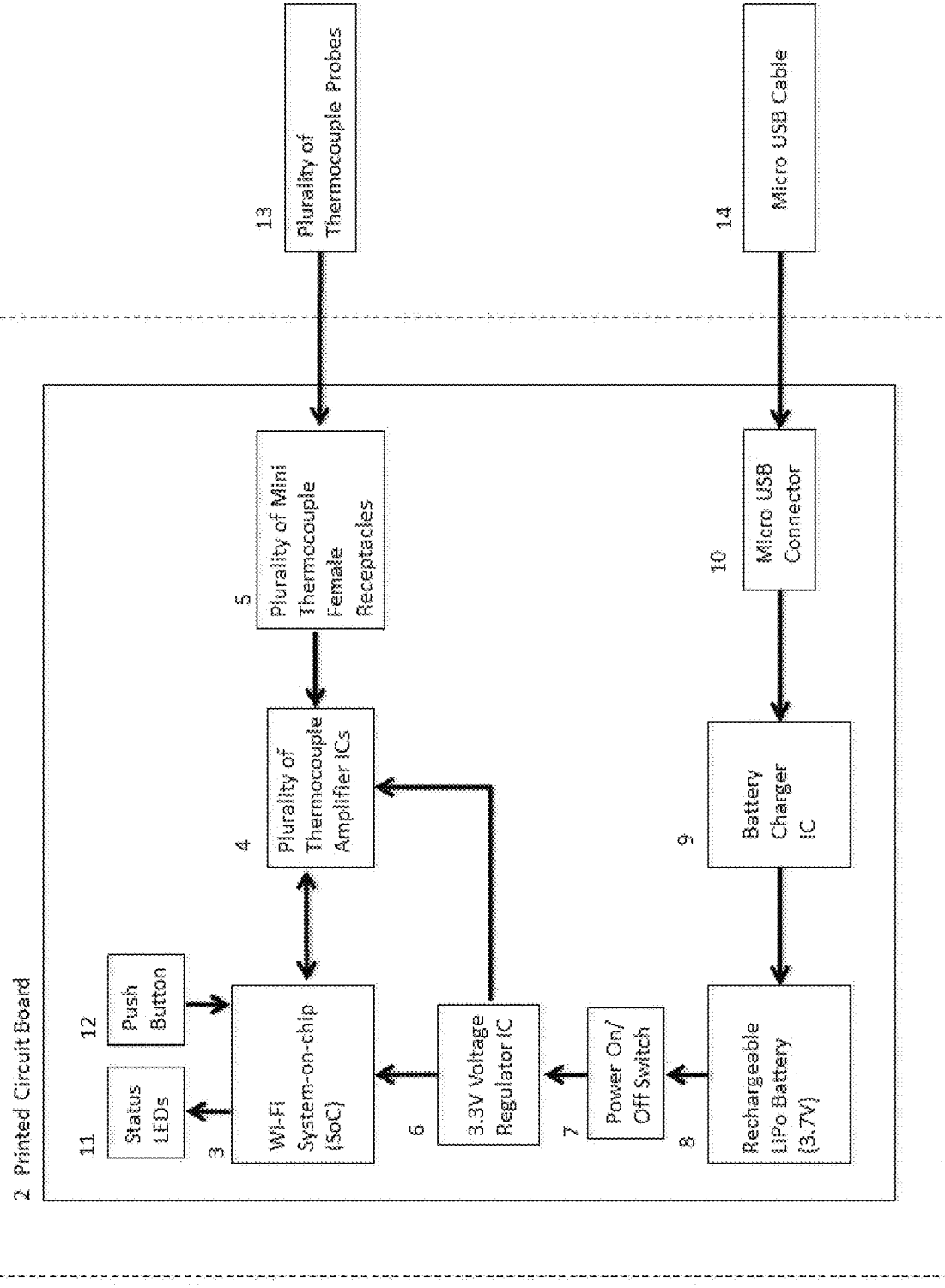

In reference to FIG. 2, the smart wireless thermo-sensing device comprises an enclosure (1), a printed circuit board (2), a Wireless SoC (all-in-one Wireless radio+microcontroller) (3), a plurality of thermo-sensing amplifier ICs (4), a plurality of mini thermo-sensing female receptacles (5), a voltage regulator IC (6), a power on/off switch (7), a rechargeable battery (8), a battery charger IC (9), a connector (10), status lights (11), an input button (12), a plurality of sensor/probes (13), and a cable (14). The enclosure (1) is the casing that houses and protects the electronic components of the smart wireless thermo-sensing device. The enclosure (1) also provides a base to attach the other components of the smart wireless thermo-sensing device. The printed circuit board (2), the Wireless SoC (3), the plurality of thermo-sensing amplifier ICs (4), the plurality of mini thermo-sensing female receptacles (5), the voltage regulator IC (6), the power on/off switch (7), the rechargeable battery (8), the battery charger IC (9), the connector (10), status lights (11), and the input button (12) are located inside the enclosure (1).

Figure 3:
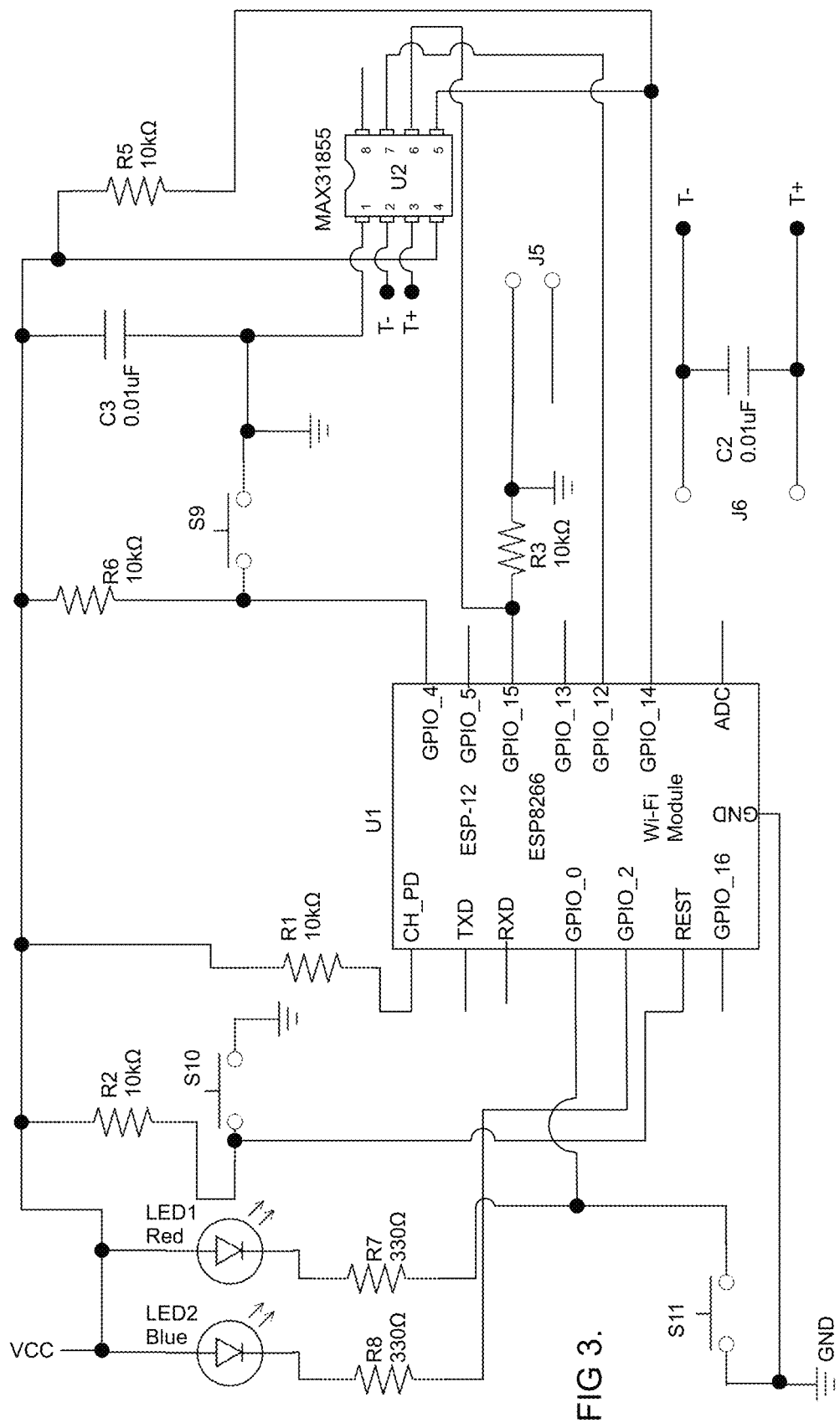
Figure 4:
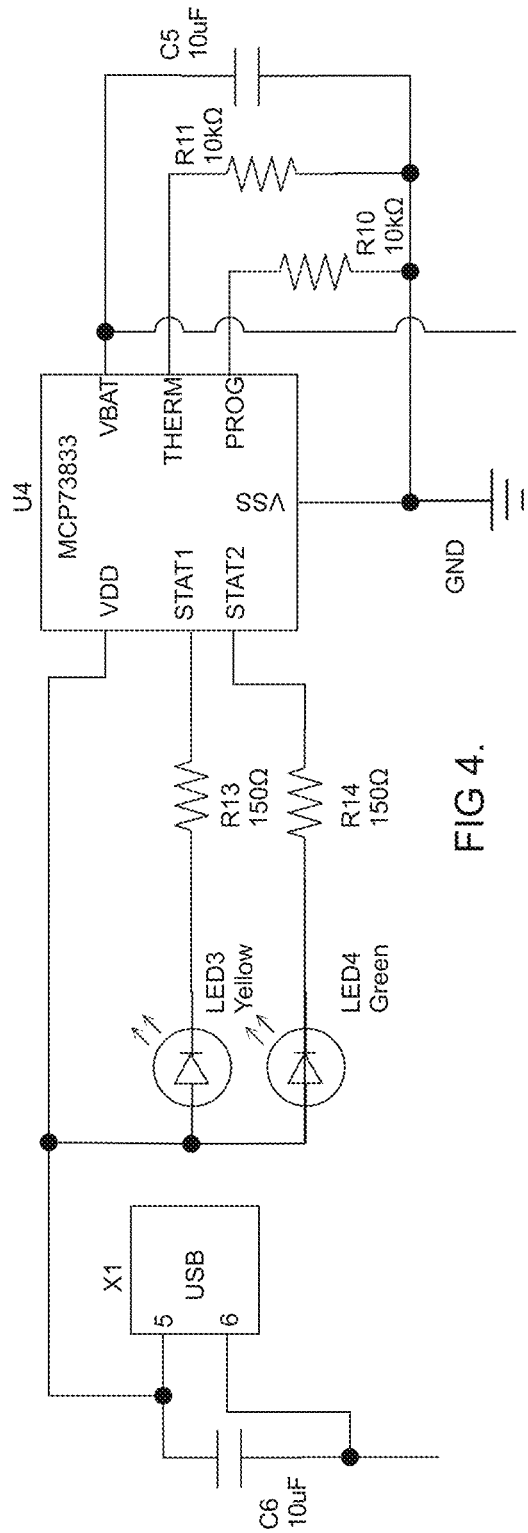
Figure 5:
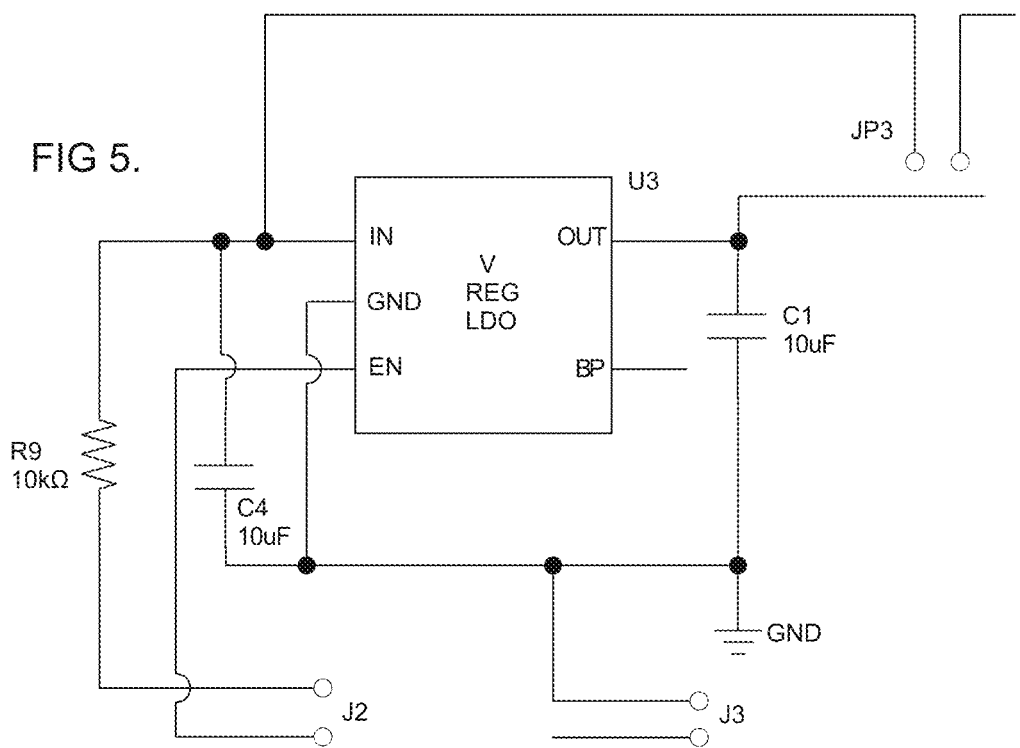

In reference to FIG. 3, FIG. 4, and FIG. 5, the wireless SoC (3) the diagrams are meant as an example and not an exclusive way to wire the circuitry. The plurality of thermo-sensing amplifier ICs (4), the plurality of thermo-sensing receptacles (5), the voltage regulator IC (6), the power on/off switch (7), the rechargeable battery (8), the battery charger IC (9), the connector (10), status LEDs (11), and the push button (12) are electronically connected to the printed circuit board (2). The Wireless SoC (3) implements the control logic that is used to manage the other electronic components. The Wireless SoC (3) also provides the wireless radio interface to the smart wireless thermo-sensing device so that it can be remotely connected. The plurality of thermo-sensing amplifier ICs (4) is used to digitize the signal from the plurality of thermo-sensing probes (13), and perform cold-junction compensation sensing and correction. The data is output over the data bus of the plurality of thermo-sensing amplifier ICs (4), and is read by the wireless SoC (3) using its digital I/O interfaces. The pluralities of thermo-sensing receptacles (5) are used to connect to the plurality of thermo-sensing probes (13), and are used to deliver the thermo-probe signal to the plurality of thermo-sensing amplifier ICs (5). Many different kinds of thermo-sensing probes can be attached. The voltage regulator IC (6) is an electrical regulator that maintains a constant voltage level and supplies the main power to the Wireless SoC (3) and the plurality of thermo-sensing amplifier ICs (4). The rechargeable battery (8) supplies the main power source and is fed to the voltage regulator IC (6) through a power on/off switch (7), which controls whether power is being sourced or not. This allows the user to save power when the smart Wireless thermo-sensing device is not in use by turning it off. The rechargeable battery (8) is also electronically connected to the battery charger IC (9), which manages the charging of the battery. The battery charger IC (9) takes the input power signal coming from the connector (10), which is in turn received from the externally connected micro USB cable (14). The battery charger IC (9) uses the input power signal to charge the rechargeable battery (8). The status lights (11) are controlled by the wireless SoC (3) and provides an output indicator to the user such as wireless communication traffic in progress or a battery low signal. The input button (12) is used for commissioning the smart wireless thermo-sensing device using wireless protected setup (WPS) and for factory reset purposes.

The external components that are used in the smart wireless thermo-sensing device are a plurality of thermo-sensing probes (13), and a cable (14). The plurality of thermo-sensing probes are used to sense the temperature of a surface or the inside temperature of an object as part of any temperature monitoring process. For example, the thermo-sensing components called thermocouples are used extensively in the steel and iron industries to monitor temperature and chemistries throughout the steel making process.

Another thermocouple example is based on a commercial HTST (High Temperature, Short Time) pasteurization process for milk. The process requires several steps in which the milk must be heated from a holding temperature to the required temperature (e.g. 72 degrees Celsius) to destroy microbes and harmful enzymes. It is then held at that temperature for a number of seconds before moving on to the next stage in the process. The thermocouple is not susceptible to moisture damage and offers a fast response time compared to other temperature sensors, which is needed for this very temperature critical process.

In consumer, food-related applications, the temperature inside a turkey can be monitored while the turkey is cooking for 7 to 8 hours, thereby notifying the user when the optimal temperature inside the turkey is reached. Some thermo-sensing devices such as thermistor-based devices do not endure such long-term exposure as the sensor can suffer moisture damage. This invention overcomes this by allowing the user to attach a thermo-sensing probe to the invention and calibrate it through the user interface.

Figure 6:
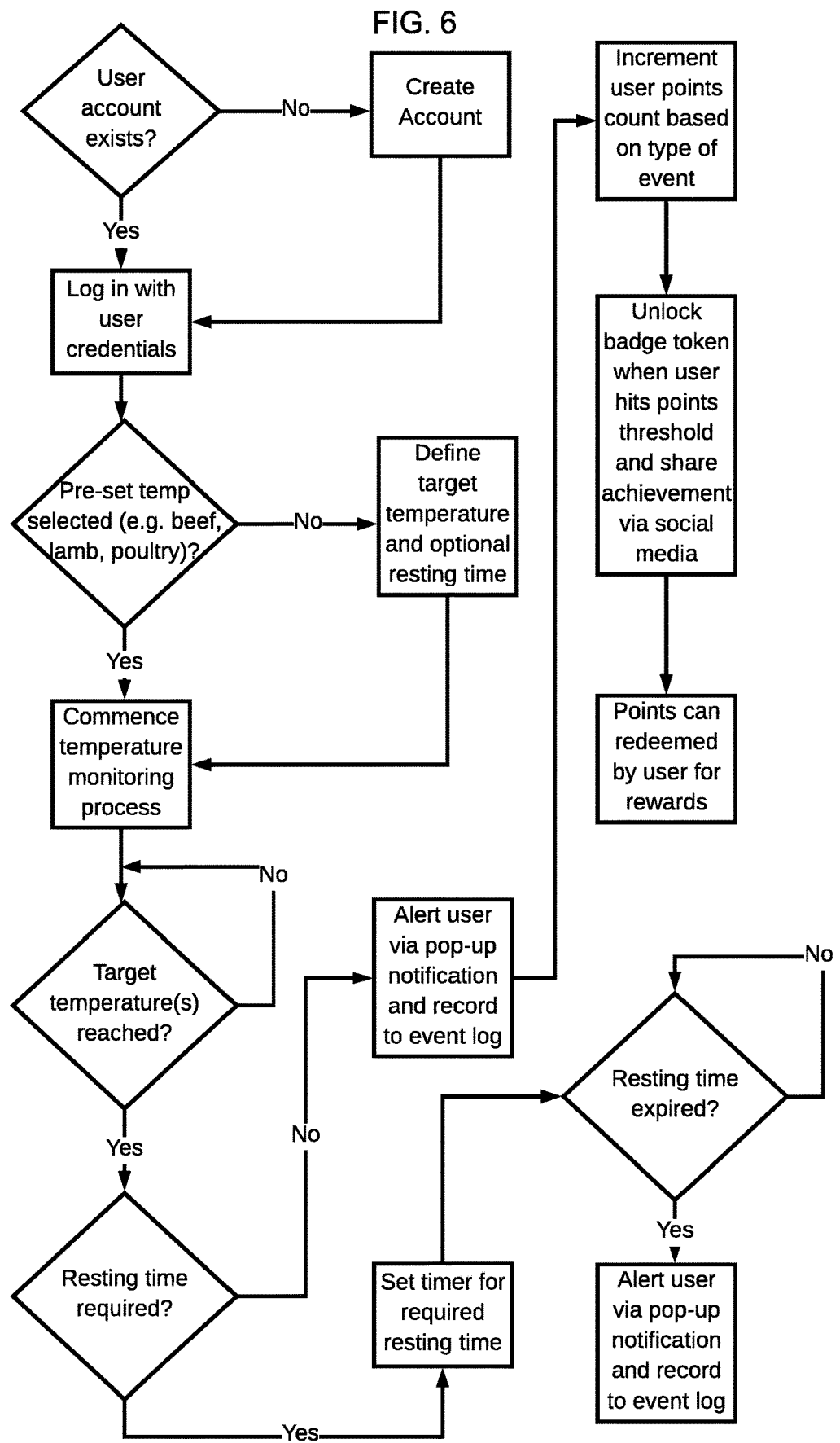

In reference to FIG. 6, this is one example of a food cooking process with the invention. The process begins when the user is prompted by a computing device to enter a login with their existing user credentials, or creates a new one. The user account binds the plurality of specific Smart Wireless thermo-sensing devices and their data to that particular user. Next, the user will be prompted to select one of the pre-set temperature selections such as for beef, lamb, poultry, etc. for example, when the internal temperature of a turkey is 165 degrees F., it is considered done. Therefore, if a user cooks a turkey, the pre-set temperature for turkey (165 degrees F.) would be selected. If a user does not select one of the pre-set temperatures, the user can define a plurality of target temperatures as well as optional resting times to preserve maximum flavor and juiciness, or consistency (in the case of candy) of the item that is being cooked.

Assuming the heating instrument (such as a conventional oven) has reached its pre-heat temperature, once the pre-set or user-defined temperature(s) has been selected, the user begins the temperature monitoring process by placing the probe in the desired part of the item being cooked (e.g. in the breast of the turkey), and then placing the item being cooked in the heating instrument. This marks the beginning of the temperature monitoring process. Once the target temperature(s) has been reached (whether via pre-set or user-defined), the user will be alerted by a pop-up notification from the web-enabled computing device's app. This event will also be recorded to the local database of the app and will increment the user points count based on the type of event it was. For example, after cooking a steak to the temperature required for medium-rare quality, the user may accrue 10 points. For cooking a turkey to the temperature required for optimal meat quality, the user may accrue 50 points, additionally the user can input cooking information such as ambient temperature and type of cooking device which will be stored in the database.

Once the user accumulates points above a certain threshold, a badge token is unlocked. For example, the first time the user may unlock a badge called "You're cooking, now!", and the 10th time they've cooked a turkey the user may unlock a badge called "Turkey Master!". The badge token is used to signify that the user has reached a certain achievement level, and may share that achievement using social media methods. These badges could also be associated with other businesses allowing for advertising over the invention and user unlocked coupons for the businesses.

The user may also redeem their accumulated point total once they reach various thresholds for rewards. For example, 250 points redeemed may present them with a gift certificate reward, or a discount to certain products or services from partner companies.

As previously mentioned, these mechanisms are designed to encourage more frequent use of the smart wireless thermo-sensing device and promote community involvement and an ever-growing database of heating/cooking information.

Recorded events, points, badges, and rewards information are considered part of the "application data" and are uploaded to the backend server, providing historical access and future analysis of the data by users of the invention. If resting time is required, a timer will be automatically started and the user will again be alerted by a pop-up notification from the web-enabled computing device's app when the timer expires. At this point, the temperature monitoring process is complete and the food item is ready to be served.

It is anticipated that a network of users will be established, and from this network, useful data such as each user's heat measurements can be collected for use in deeper analysis.

Data from each heating and/or cooking temperature measurement can be uploaded to a server and accessible through means associated with a proprietary application, or through social media means. Data such as cook time, temperature, settings, doneness temperature, ambient temperature, internal temperature and type of heating process can be stored in a database and used by users in the network. This type of data can allow the user to study the temperature monitoring process for its accuracy and efficiency, allowing the user to optimize the process.

In reference to FIG. 7, the smart wireless thermo-sensing device uses WI-FI Protected Setup (WPS) for commissioning purposes. WPS is a standard adhered to by the WI-FI Alliance and is a certifiable method for commissioning wireless devices. In order to steer the smart wireless thermo-sensing device to join the correct Wireless Access Point, the user presses the WPS input button on the wireless access point it wishes the smart wireless thermo-sensing device to join (15). This causes the Wireless access point to enter WPS mode. The user then presses the WPS input button on the smart wireless thermo-sensing device to enter a WPS setup session with the wireless access point (16). Once the WPS session has successfully completed, the smart wireless thermo-sensing device is connected to the wireless Access point (17).

In reference to FIG. 8, the smart wireless thermo-sensing device can optionally use Wireless Direct Connect with the web-enabled computing device such as a smartphone. In this mode, the user first enables Wireless Direct mode on the web-enabled computing device (18), then on the smart wireless thermo-sensing device (19). At the end of the Wireless Direct session, the smart wireless thermo-sensing device is directly connected to the web-enabled computing device (20).

In reference to FIG. 9, in order for the web-enabled computing device's app to communicate with the smart wireless thermo-sensing device, it has to be discovered. The discovery process is initiated by the user pressing a button on the web-enabled computing device's app (21), which in turn causes a simple UDP broadcast discovery message to be sent out by the web-enabled computing device (22). The smart wireless thermo-sensing device then responds with its device name, IP address and MAC address (23). Once the IP address of the smart Wireless thermo-sensing device is obtained, it can communicate with the web-enabled computing device. The web-enabled computing device app stores this information in its local database (24).

In reference to FIG. 10, the discovery process in Wireless Direct mode is the same as above, except that all discovery process communication between the web-enabled computing device and the smart Wireless thermo-sensing device is direct and does not go through a Wireless access point. The discovery process is initiated by the user pressing a button on the web-enabled computing device's app (25), which in turn causes a simple UDP broadcast discovery message to be sent out by the web-enabled computing device (26). The smart Wireless thermo-sensing device then responds with its device name, IP address and MAC address (27). Once the IP address of the smart Wireless thermo-sensing device is obtained, it can communicate with the web-enabled computing device. The web-enabled computing device app stores this information in its local database (28).

In reference to FIG. 11, there are two modes in which the web-enabled computing device can communicate with the smart Wireless thermo-sensing device. In Mode A, all communication uses UDP, is secured using WPA2 security, and goes through a wireless access point. Mode A allows for the greatest range of access since the user does not have to be in direct radio range of the smart Wireless thermo-sensing device. In Mode B, all communication also uses UDP and is secured using WPA2 security, but is direct from the web-enabled computing device to the smart wireless thermo-sensing device. Mode B allows for direct communication in deployments where a wireless access point does not exist. The ability for the smart Wireless thermo-sensing device to employ both communication modes A and B provides versatility in terms of deployment.

Figure 12:
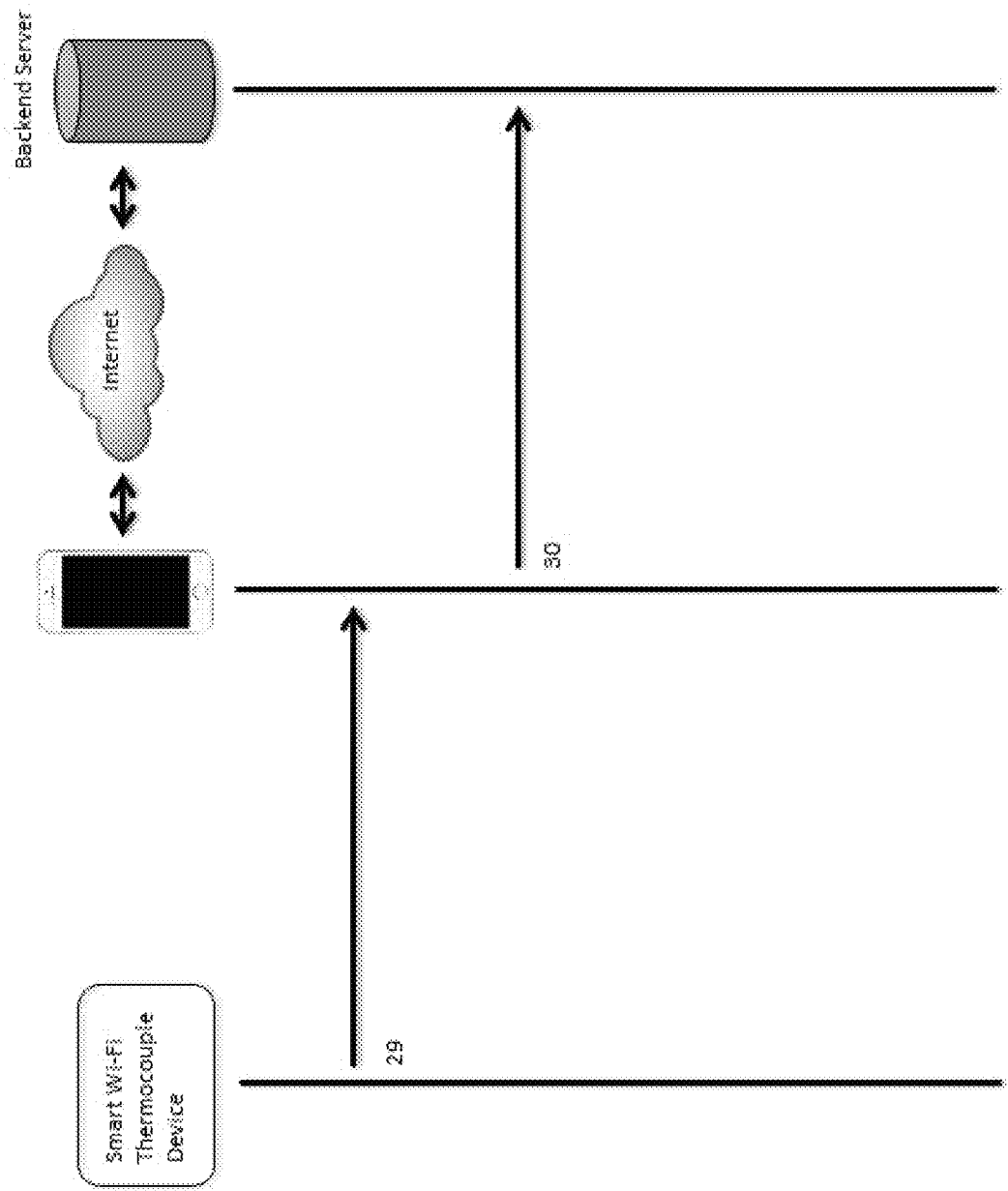

In reference to FIG. 12, user application data is automatically stored to the user's database record store on a backend server. This allows the user to keep data on the backend server for historical access and future analysis. User data received from the smart wireless thermo-sensing device by the web-enabled computing device app (29) is automatically stored on the backend server using secure HTTPS transactions (30).

In reference to FIG. 13, the firmware on the smart Wireless thermo-sensing device can be updated over-the-air, which removes the need for the user to physically touch the device as part of the update process. The web-enabled computing device app periodically checks whether a new firmware update image for the smart wireless thermo-sensing device is available (33). If a new firmware update image for the smart Wireless thermo-sensing device is available, then the web-enabled computing device app will download the new image to its local storage (34). The user is then notified by the web-enabled computing device app that a new firmware update is available (35). If the user accepts the new firmware update, the web-enabled computing device will initiate the transfer of the new image to the smart wireless thermo-sensing device (36). When the firmware upgrade is completed, the smart wireless thermo-sensing device will send a message to the web-enabled computing device indicating the firmware upgrade has completed (37). The user is notified by the web-enabled computing device app that the firmware upgrade has completed (38).

Although the invention has been explained in relation to its preferred embodiment, it is to be understood that many other possible modifications and variations can be made without departing from the spirit and scope of the invention as hereinafter claimed.

The invention claimed is:
1. A method of operating a smart wireless thermo-sensing device used for cooking and providing temperature readings, points accumulation and redemption, unlocking achievement badges, stored and displayed on a web-enabled computing device by executing computer-executable instructions stored on a non-transitory computer-readable medium, the method comprising:
providing a plurality of user accounts, wherein each of the plurality of user accounts includes user account name, and a password;
providing the smart wireless thermo-sensing device, wherein the smart wireless thermo-sensing device comprises a plurality of thermo-sensing probes where one or multiple probes are selected for the cooking process;
providing a graphic user interface, wherein the web-enabled computing device can display the graphic user interface;
sending a UDP broadcast discovery message with the web-enabled computing device;
the user interface prompting the user to enter information about the temperature measuring cooking process;
the user interface allowing entry of calibration data specific to the thermo-sensing probe selected for the cooking process;
continuously retrieving data from the thermo-sensing probes;
storing the current thermo-sensing probe temperatures to the computing device;
displaying the plurality of current thermo-sensing probe temperatures, the plurality of thermo-sensing probe temperature history on the graphical user interface;
prompting to select the pre-set temperature setting or enter a plurality of target set temperatures for the plurality of thermo-sensing probes, and optional resting time through the graphical user interface;
activating an alert when the plurality of target temperatures has been reached through the graphical user interface;
the operator of the smart wireless thermo-sensing device accumulating points for each completed cooking session;
the operator of the smart wireless thermo-sensing device redeeming the accumulated points for rewards including products, services, or coupons;
the operator of the smart wireless thermo-sensing device unlocking and accumulating achievement badges for reaching accumulated points thresholds determined by the web-enabled computing device's app; and
the operator of the smart wireless thermo-sensing device unlocking coupons and advertisements only accessible to the operator after reaching the achievement levels corresponding to the accumulated points thresholds determined by the web-enabled computing device's app.

\* \* \* \* \*